United States Patent Office 3,325,136
Patented June 13, 1967

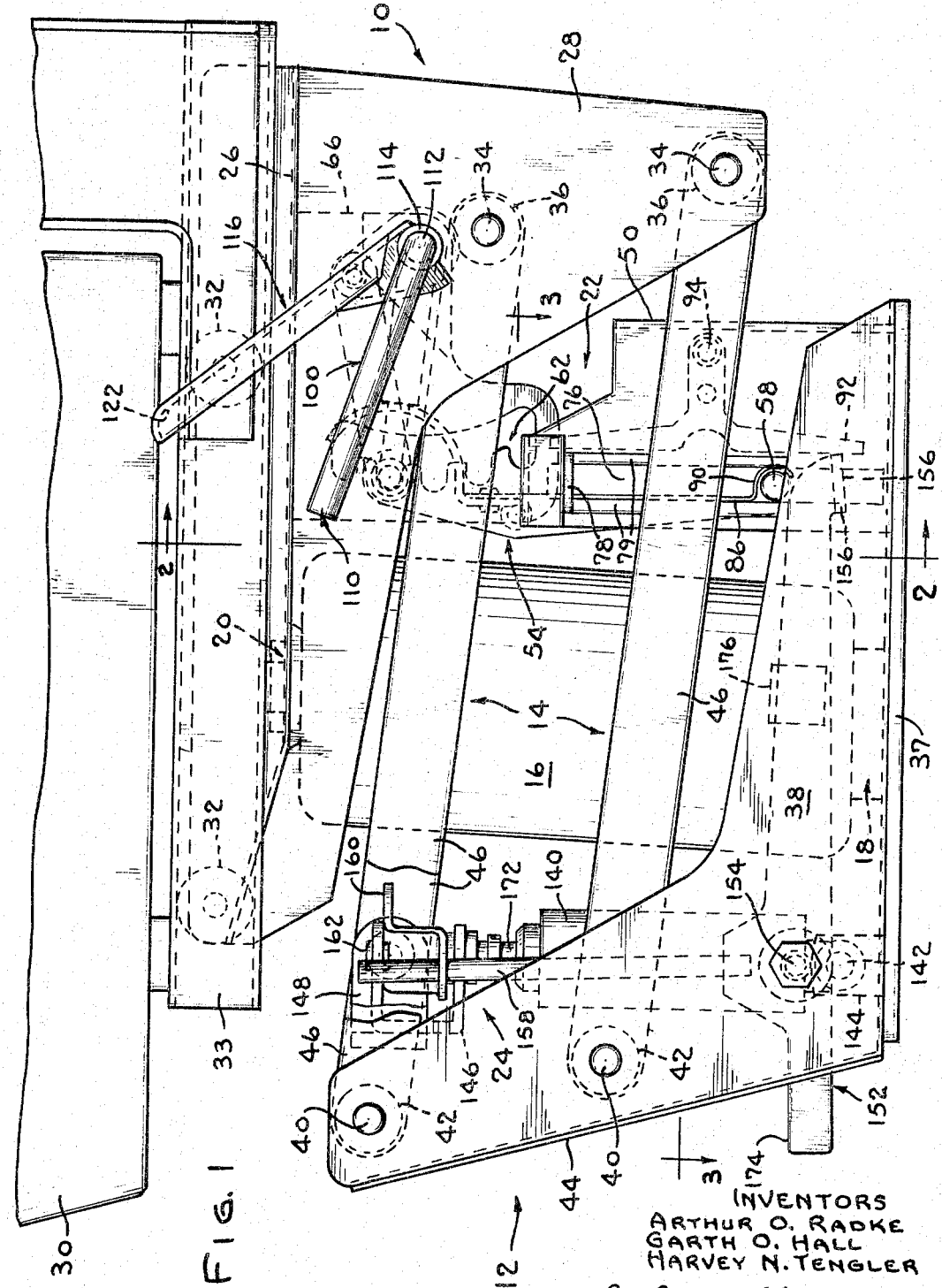

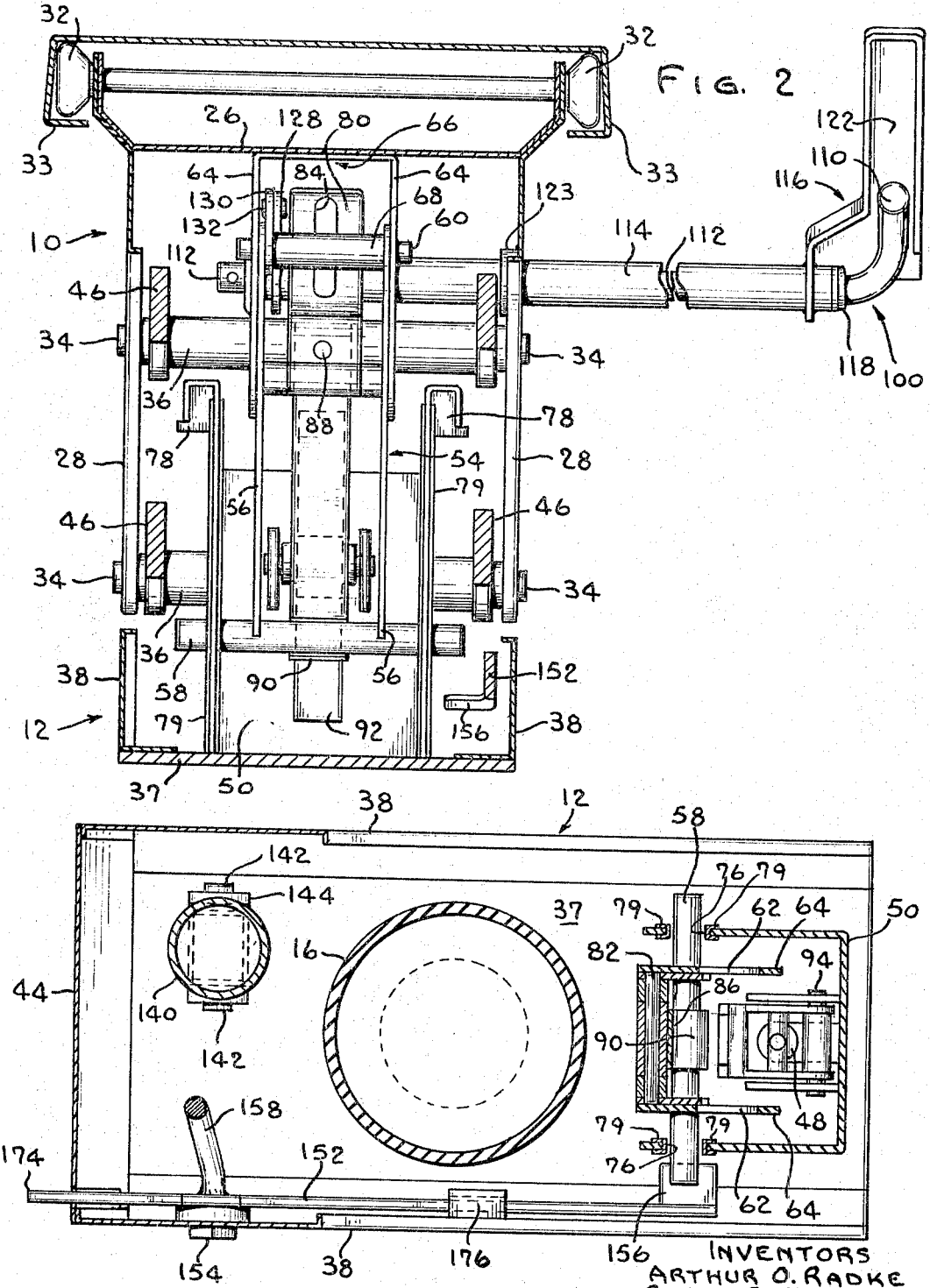

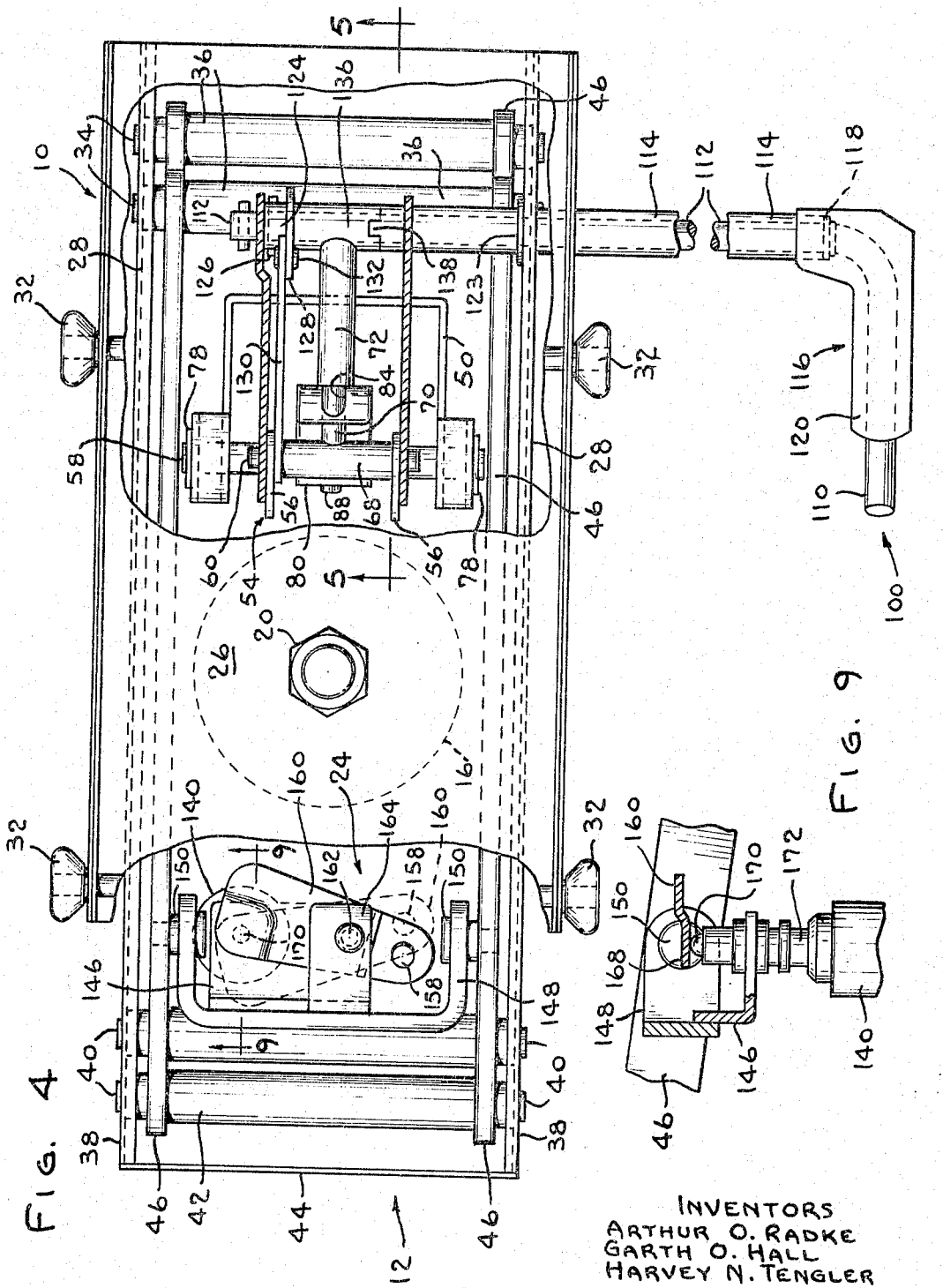

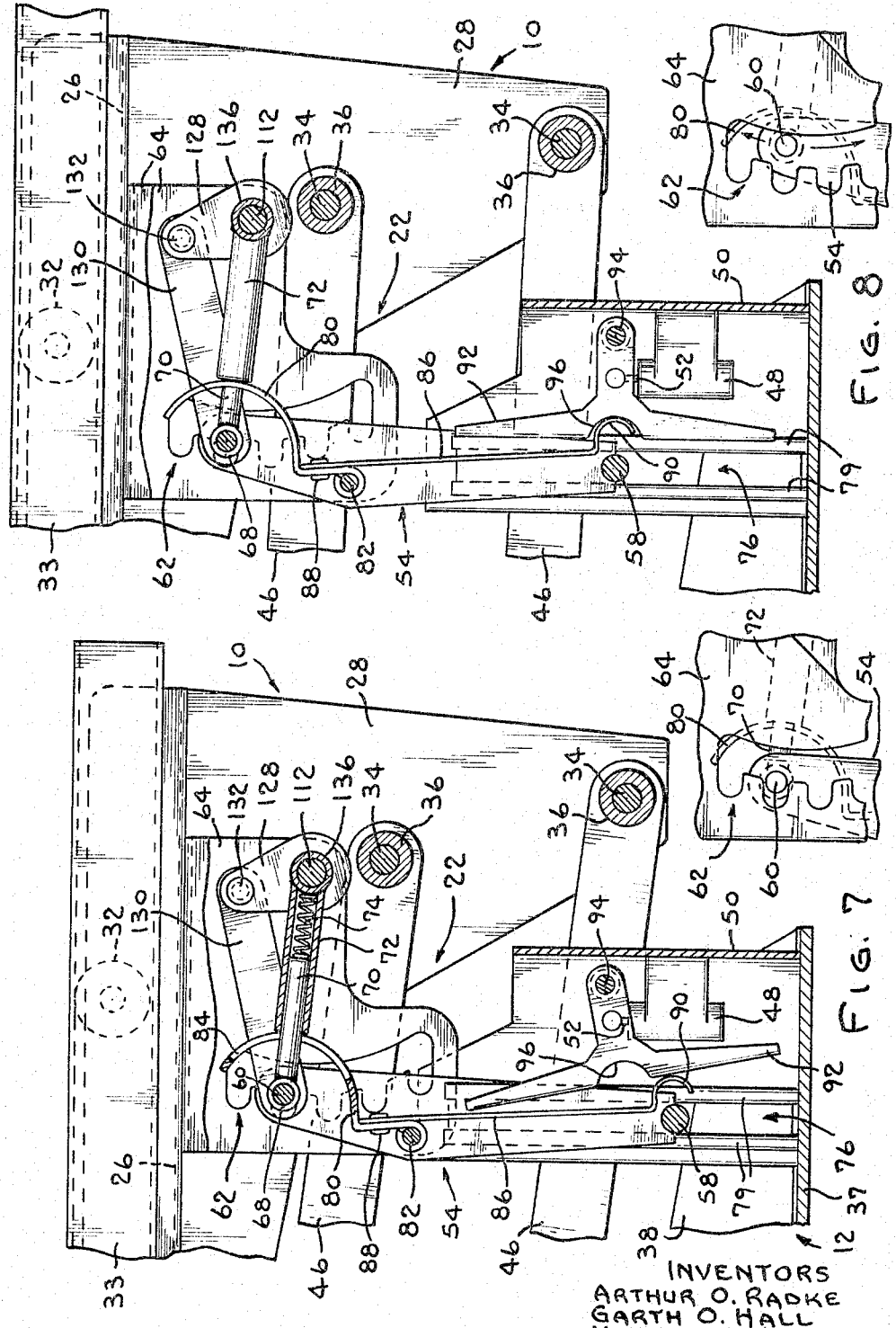

3,325,136
SEAT SUSPENSION
Arthur O. Radke, Shorewood, Garth O. Hall, Brookfield, and Harvey N. Tengler, New Berlin, Wis., assignors to Bostrom Corporation, Milwaukee, Wis., a corporation of Wisconsin
Filed Mar. 18, 1965, Ser. No. 440,786
9 Claims. (Cl. 248—400)

This invention pertains to improvements in vehicle seats and particularly to improvements in means for varying the ride and seat height positions of such seats.

The ride position of a vehicle seat is the vertical position of the seat to which it is depressed solely by virtue of being occupied. That ideal ride position is located at a predetermined point between fixed upper and lower amplitude limits of the permissible oscillatory movement of the seat (usually at the mid-point between these limits) and thus defines the maximum downward and upward travel to which the occupant will be subjected during oscillation of the seat. In absence of any adjustments, the ride position of a heavier than average occupant will be below the ideal ride position and that of a lighter than average occupant will be above such position. In either event, the permissible oscillatory movement of the seat and its occupant will be shorter than desired in one direction and longer in the other direction. Because of this fact, the seat will reach its upper or lower limit at a greater frequency than would be the case with an average occupant and will provide an inferior ride.

The industry has recognized the advantages of ride position adjustment. The usual approach has been to provide manual adjustment means which permit the occupant to change the spring force of the seat suspension and thereby vary the ride position of the seat. The most prevalent objection to the prior art adjustment mechanisms has been that the selection of the particular ride position is left up to the occupant, who in many instances, merely makes a guess as to the particular adjustment and, therefore, is often apt to select a position not suited for his particular weight.

In time, the occupant might experiment sufficiently to arrive at the best position, however this is clearly not desirable, and in any event, in equipment which is frequently used by different personnel, even the experimentation might not be possible. Attempts have been made to correct this disadvantage, however, a satisfactory solution has not been found prior to the present invention, primarily because the mechanisms necessary to improve the ride position adjustments have been quite complex and cumbersome to operate.

The principal object of this invention is to provide a mechanism which will adjust the ride position of a seat in accordance with the weight of the operator, and which will permit seat height adjustment without affecting the ride position of the seat.

This object is attained by the provision of a control member by means of which the bias of the seat suspension can be changed. The control member is fixed to either the base or seat support of the seat structure and cooperates with stop means fixed to the other part of the support structure to thereby limit the amplitude of the seat oscillation to a predetermined distance. The position of the control member in respect to the stop means determines the ride position which, in absence of other features, would vary in accordance with the weight of the occupant. A mechanism is provided for altering the bias of the suspension's springs when the control member is at another than at a predetermined position in respect to the stop means. Thus, if the occupant's weight depresses the seat to a position other than the ride position, the bias will be varied until the seat reaches the correct ride position at which the control member will be in the predetermined position in respect to the stop means.

Further, a mechanism is provided for changing the relative position of the control member in respect to the stop means independent of the weight of the occupant. This feature permits the seat height to be adjusted by varying the bias of the springs yet does not cause a change in the ride position of the seat. Because of this, the permissible upward and downward movement of the occupied seat can always be maintained the same regardless of the weight of the occupant, yet the seat height can be adjusted to suit any particular size occupant.

Further, damping means are provided which will be automatically locked into the suspension at a predetermined amplitude. Again, the provision of the damping will be independent of the weight and height of the occupant.

In view of the above, a further object of the present invention is to provide a seat suspension in which the oscillatory motion of the seat will be damped at a predetermined amplitude regardless of the seat height position.

Other objects and advantages will be pointed out it, or be apparent from, the specification and claims, as will obvious modifications of the single embodiment shown in the drawings, in which:

FIG. 1 is a side plan view of the seat suspension embodying the present invention, with portions being broken away to better illustrate some features thereof;

FIG. 2 is a cross-sectional view taken on lines 2—2 of FIG. 1;

FIG. 3 is a cross-sectional view taken on lines 3—3 of FIG. 1;

FIG. 4 is a top plan view of the suspension shown in FIG. 1 with portions being broken away to better illustrate some features of this invention;

FIG. 5 is a side view of the seat position adjustment mechanism, with portions being broken away for the sake of clarity and with the parts of the mechanism being shown in a position at which the seat height is being raised in order to move it upwardly to a proper ride position;

FIG. 6 is a view as that shown in FIG. 5, but showing the parts at the time when the ride position has been attained;

FIG. 7 is a fragmentary side view of the control member and rack at a time when the control member has been only partially withdrawn from the rack for the purpose of adjusting ride position;

FIG. 8 is a view similar to that of FIG. 7, but showing the control member fully withdrawn as it is necessary during height adjustment of the seat; and FIG. 9 is a fragmentary view of the connection between the shock absorber and the upper parallelogram.

As best shown in FIG. 1, the support structure embodying the present invention is of the parallelogram type having a seat support frame 10 connected to a base frame 12 by a pair of parallelogram members 14 and having a fluid spring 16 connected at 18 to the base frame and at 20 to the support frame. A seat position adjustment mechanism 22 and a damping control mechanism 24 are positioned between the two frames.

The support frame 10 is of a U-shaped cross-section (FIG. 2) with a horizontally extending support platform 26 and two dependent side panels 28. A vehicle seat 30 may be directly fixed to the platform or may be mounted on rollers 32 to permit fore and aft motion of the seat in respect to the support structure. In the latter case, the seat may be provided with slide rails 33. Two transversely extending shafts 34 are fixed at their opposing ends to the side panels and each rotatably supports a tubular cross member 36 of one of the members 14.

The base frame 12 is of similar construction as frame 10 and is adapted to be fixed to the vehicle. It has a floor platform 37 and its side panels 38 similarly hold transversely extending shafts 40 each of which rotatably supports a tubular cross member 42 of one of the members 14. A front panel 44 is provided to prevent the occupant's legs from coming in contact with some of the moving parts of the support structure.

The members 14 are of a rectangular frame type construction (FIG. 4) and are comprised of side arms 46 which are rigidly connected at their ends to cross members 36 and 42. This construction provides lateral and transverse stability to the seat and also assures rectilinear oscillatory motion of the vehicle seat in respect to the base.

The fluid spring 16 is an air spring of conventional construction having expandable sidewalls which confine a given quantity of air to provide cushioning to the seat. Conventional communication means (not shown) are provided for adding and withdrawing air from the spring to thereby vary its biasing characteristicss.

The seat position adjustment mechanism 22 controls the position of the suport frame in respect to the base frame by virtue of adding or withdrawing air from the air spring 16. The adjustment mechanism includes a two-way air valve 48 (FIGS. 3, 5 and 6) mounted in a housing 50 and a plunger 52 which is biased in a neutral position. When the plunger is depressed the valve connects the air spring to a source of high pressure air and when the plunger is lifted above the neutral position, the valve connects the air spring to an outlet to the atmosphere. For the sake of clarity, the lead connections of the valve and air spring are not shown.

The actuation of the valve 48 is controlled by a control member 54 and is essentially dependent upon the vertical position of this member in respect to the support frame 10. The control member 54 is of a rectangular frame construction (FIG. 2) having two downwardly extending sides 56 which are fixed at their lower ends to a transversely extending pin 58 and at their uper ends to a similarly extending pin 60. The control member is fixed in a preselected vertical position to the seat support frame 10 by the pin 60 which is engaged between two adjacent teeth of a rack 62 provided in the downwardly extending side 64 of the U-shaped bracket 66 (FIG. 2). The bracket is fixed to the platform 26 of the seat support frame 10. The pin 60 is maintained in engagement with the rack by a T-shaped member which has a tubular cross bar 68 surrounding the central portion of the pin 60 and a stem 70 which is slidably received with a cylinder 72 and is biased outwardly by a spring 74 (FIG. 5).

The ends of the pin 58 are received in vertically extending slots 76 provided in the sides of the housing 50 which is fixed to the base frame 12. When the base frame is subjected to vibrations, the pin 58 reciprocates within the slots in accordance with the oscillatory motion of the seat. This reciprocal motion is limited by the upper and lower ends of the slot. The pin 58 may be considered as a stop member which is adjustably connected to the seat and the slot may be considered as a stop member which is connected to the base. These stop members limit the maximum permissible oscillatory movement of the seat in respect to the base to a distance equal to the length of the slot. If desired, resilient cushions 78 may be provided at the upper or both ends if the slots to damp the impact as the pin travel is stopped. Also, nylon or similar liners 79 may be provided on each side of the slots.

When the seat is occupied and in a static condition, the position of pin 58 within the slots 76 defines the ride position of the particular occupant. In absence of any adjustment, the ride position would be progressively lower with an increase in occupant weight and therefore the permissible upward and downward travel from the ride position would accordingly change with variance in the occupant weight. In order to obtain the same ride position for any occupant, valve 48 may be actuated to connect the air spring to the high pressure source if the pin 58 is below the predetermined ride position and connects the air spring to the atmosphere if the pin is above such level. When the pin is in the ride position the valve remains in the neutral position to maintain a constant quantity of air within the spring.

The valve actuation is particularly illustrated in FIGS. 5 and 6. The control member 54 is provided with a C-shaped relatively rigid lever 80 which is pivotally connected to the control member by a pin 82. The arcuate portion of the lever rests against the face of the cylinder 72 and is provided with a slot 84 through which the stem 70 extends. A resilient valve actuating component 86 is secured at its upper end to the lever 80 by a rivet 88 and has a curved switch actuating section 90 formed at the location of the pin 58.

When the control member 54 is in the position shown in FIG. 1, the pin 60 is fully engaged with the rack 62 and the component 86 is positioned vertically with its actuating section 90 nested around pin 58. With the parts of the control member in such a position, the valve 48 cannot be actuated. When the upper end of the control member is moved to the left (from the position shown in FIG. 1 to that shown in FIGS. 5 and 7) by partially withdrawing the pin 60 from the rack, pin 82 is also moved in this direction. Since similar motion of the lever 80 is prevented by the cylinder 72, the lever pivots around pin 82 in a counterclockwise direction and thereby causes the actuating section 90 to assume the outward position as shown in FIGS. 5 and 6. If at such time the position of the pin 58 is below or above the ride position, the actuating section 90 will engage the cross-bar portion of a T-shaped valve actuating component 92 and will cause the same to pivot around pin 94 to thereby either depress or raise the valve plunger 52. The air volume within the spring will change until the seat has moved to a position at which the actuating section 90 will reach the central depression 96 of the component 92. At this time the plunger 52 will assume its neutral position and the air volume change of the spring will be stopped. After this adjustment the control member 54 can be moved back to its normal position (FIG. 1) in which the actuating section 90 will be in a position in which it cannot affect the air valve.

The manual controls for the ride position and seat height adjustment are best shown in FIGS. 2 and 4. A lever 100 having a handle section 110 and a transversely extending control shaft 112 is rotatably mounted within the transversely extending tubular control shaft 114 of the second lever 116. The second lever is provided with suitable bearings 118 and a hollow handle section 120 to permit the operator to grip both handles with one hand and to rotate the lever 100 from the position shown in FIG. 1 to a position within the cavity 122 of the handle section 120. The tubular shaft 114 is in turn rotatably mounted within the right hand (FIG. 2) side 64 of the bracket 66 and in bushing 123 of side panel 28. The shaft 112 of lever 100 extends beyond the end of the tubular shaft 114 and is rotatably received in the other side 64 of the bracket 66. A bushing 124 (FIG. 4) is pinned at 126 to the shaft 112. This bushing is provided with a crank section 128 which is connected by a link 130 to the pin 60 of the control member. The crank and link are pivotally connected to each other at 132. The link 130 is provided with a suitable aperture through which the pin 60 of the control member 54 extends.

This structure permits the lever 100 to be rotated towards lever 116 to thereby move the upper end of the control member 54 to the left and cause the indexing finger to assume the outward air valve actuating position. This, of course, will facilitate ride position adjustment. When the proper ride position has been reached, the air valve will move to its neutral position and the operator may release lever 100 which will move back to its original position in response to the bias of spring 74.

If the occupant believes that the change in the vertical seat position during the ride position adjustment will not require a seat height adjustment, he only needs to rotate the lever 100 partially towards lever 116. By such partial rotation the control member 54 will be sufficiently moved to cause the air valve actuation yet its pin 60 will still remain in engagement with the rack. Because of this feature the seat height setting is not disturbed during ride position adjustment.

The seat height depends upon the position at which the control member 54 is connected to the rack 62. This position can be changed by first fully rotating the lever 100 against lever 116 to disengage the control member pin 60 from the rack (as shown in FIG. 8) and by thereafter rotating both levers as a unit to align the pin with another section of the rack.

At this point it should be noted that the cylinder 72 is rigidly connected to a bushing 136 which is in turn connected for rotation with the tubular shaft 114 at 138. For this reason the linkage controlled by the lever 100 will remain unchanged during the seat height adjustment. As both levers are rotated the valve actuating component 86 of the control member will, of course, move above or below the central portion of the valve actuating component 92 and thereby cause a change in the air volume of the spring until the time when the seat height will have changed an increment equal to the movement of the control member. At such time, both levers may be released and the seat will be at the proper ride position required by the occupants weight and at the proper seat height required by his height.

The damping control mechanism 24 is operable to automatically switch a shock absorber 140 into the suspension system when the amplitude of a seat oscillation reaches a predetermined level. The shock absorber is connected to the floor platform 37 of the base frame by pins 142 and bracket 144. It is connected to the upper parallelogram member 14 by a bracket 146 which in turn is connected to a U-shaped bracket 148, the latter being pivotally connected to the side arms 46 of the member 14 by pins 150.

The actuating mechanism for the shock absorber is comprised of a lever 152 which is pivotally fixed to one side panel 38 at 154 and which has a transversely extending flange 156 positioned close to the bottom of the slot 76 and in line with the travel of control member pin 58. An upwardly extending rod 158 is fixed to the lever 152 and is slidably engaged in an aperture of a control plate 160 which is pivotally connected by a pin 162 to the upper flange 164 of the bracket 146. The control plate has a depressed portion 168 which, with the parts as shown in FIG. 1, overlies a switch 170 of the shock absorber and thereby renders the shock absorber inoperable to damp the suspension system regardless of the fact that its piston 172 is reciprocated. Shock absorbers of this type are known in the art and therefore the details of the switching mechanism are not discussed in detail herein. When the amplitude is sufficiently large for the control member pin 58 to strike the flange 156, the lever 152 is pivoted in a clockwise direction around 154 and causes the rod to be moved in a counterclockwise direction (between the solid and dotted line position shown in FIG. 4). This motion causes the control plate 160 to similarly pivot around pin 162. This motion of the control plate removes the depressed portion 168 from switch 170 and to render the shock absorber operative to damp the suspension. In the event that the operator believes that the cause for the severe oscillations has passed, he merely presses on foot pedal portion 174 of the lever 152 thereby moving it in a counterclockwise direction around pin 154 until the lever engages the inwardly extending flange 176 of the bracket fixed on the inside of the side panel 38. At this point the rod 158 will have moved the control plate 160 back to the position shown in FIG. 1 to actuate the switch 170 and thereby render the shock absorber inoperative.

Although but a single embodiment of the present invention has been illustrated and described, it will be apparent to those skilled in the art that various changes and modifications may be made therein without departing from the spirit of the invention or from the scope of the appended claims.

We claim:

1. In a vertically adjustable seat having a seat part resiliently mounted on a base part for oscillatory motion in respect thereto, the combination of:

control means including a stop member connected to the seat part and cooperating with a stop member which is connected to said base part to limit the maximum permissible oscillatory movement of the seat part in respect to said base part to a predetermined distance;

said control means being actuable to be responsive to the static occupant load of the seat part to relatively move said seat part and one of said stop members in respect to the other of said stop members and said base part until said stop members assume a predetermined position in respect to each other; and means to actuate said control means independently of the occupant load to cause said relative movement and to thereby permit a variance of the position of a statically loaded seat part in respect to the base part without changing said predetermined position of said stop members in respect to each other.

2. The combination according to claim 1 wherein said control means includes an adjustable spring means which resiliently supports the seat part upon the base part and wherein said control means changes the spring force of said spring means in response to said occupant load to cause the seat part and said stop member connected thereto to move relatively to said other stop member until the two stop members have assumed said predetermined position.

3. The combination according to claim 2 wherein said spring force is changed by spring force adjustment means having one component fixed to one of said parts for movement therewith and another component fixed to the other of said parts, and wherein said control means is actuable by moving one of said adjustment means components to a position in which it cooperates with the other of said components to change said spring force when said stop members are at any other than said predetermined position.

4. The combination according to claim 3 wherein said means to actuate said control means independently of the occupant load is comprised of adjustable connecting means adjustably connecting one of said stop members and one of said components to one of said parts to thereby permit equal change in the relative position of said stop member and said one of said components relative to said one of said parts.

5. A vehicle seat which can be adjusted so that at any occupant weight the statically loaded position of the seat is at a predetermined distance from the top and bottom limits of the maximum permissible oscillatory movement of the seat, and which can be further adjusted to vary the height of the seat while it is statically loaded without changing its position in relation to said top and bottom limits, the vehicle seat comprising:

a seat part;

a base part;

fluid spring means resiliently supporting said seat part on said base part for oscillatory movement in respect to said base part when the latter is subjected to vibrations;

a first stop member connected to one of said parts;
a second stop member adjustably connected to the other of said parts; said first and second stop members cooperating with each other to limit the maximum permissible oscillatory movement of said seat part in respect to said base part to a predetermined distance;
valve means connected to said fluid spring means and being actuable to connect said fluid spring means to a source of fluid and to thereby increase the statically loaded height of said seat part in respect to said base part, and also being actuable to connect said fluid spring means to an outlet to thereby bleed fluid from said fluid spring means and thus decrease the statically loaded height of said seat part in respect to said base part;
said valve means including a first and a second valve actuating component which are capable of cooperating to actuate said valve means; the first component being connected to one of said parts and the second component being connected to said other of said parts; and
adjustment means connecting said second stop member and said second component to the other of said parts; said adjustment means being actuable to move said second stop member and said second component in unison between a plurality of vertically spaced adjustment positions in respect to said other of said parts; said adjustment means being further actuable at any of said adjustment positions to move said second component to a position in which it cooperates with said first component to cause said valve means to change the statically loaded seat part height to a position at which the first and second stop members are at a predetermined relative position in respect to each other.

6. A vehicle seat according to claim 5 wherein said valve means is normally in a closed position in which it does not permit either addition or deletion of fluid from said fluid spring means, and wherein said adjustment means includes spring means which normally biases said second component to a position in which said two components are incapable of cooperating to actuate said valve means, with said second component being movable in respect to said second stop member and in opposition to said bias when said adjustment means is actuated to move said second component to said position in which it cooperates with said first component.

7. A vehicle seat according to claim 6 wherein said valve means includes a valve housing and a valve plunger which is normally biased to a neutral position at which said valve means is in said closed position, and wherein said valve housing is connected to one of said parts with said first valve actuating component being pivotally connected to said one of said parts and being connected to said plunger in such a manner that upon pivoting in one direction away from a neutral position said first component will cause said plunger to actuate said valve means to connect said fluid spring means to a source of fluid, and that upon pivoting in the other direction said first component will cause said plunger to actuate said valve means to connect said valve means to an outlet; said first valve actuating component being generally T-shaped with the base of the T being pivotally connected to said one of said parts and with the cross-bar portion of the T extending generally vertically and being engageable by said second component to cause said first component to pivot in said one direction whenever said second component engages said cross-bar portion below the base of said T and to cause said first component to pivot in said other direction whenever said second component engages said cross-bar portion above the base of said T.

8. A vehicle seat according to claim 7 wherein said fluid spring means is an air spring and wherein said valve means is actuable to add and delete air from said air spring.

9. A vehicle seat according to claim 5 including damping means which is actuable in response to relative movement between said two stop members to provide damping to said oscillatory movement after said first stop member has been moved a relatively far distance away from said predetermined relative position.

References Cited

UNITED STATES PATENTS

| 2,821,239 | 1/1958 | Brendel | 248—400 X |
| 3,049,330 | 8/1962 | Coons et al. | 248—419 |
| 2,150,855 | 9/1964 | Carter et al. | 248—400 |
| 3,211,411 | 10/1965 | Rood | 248—399 |
| 3,218,019 | 11/1965 | Elfes et al. | 248—399 |

FOREIGN PATENTS 1,089,285 9/1960 Germany.

CLAUDE A. LE ROY, *Primary Examiner.*

R. P. SEITTER, *Assistant Examiner.*